Figure 1:
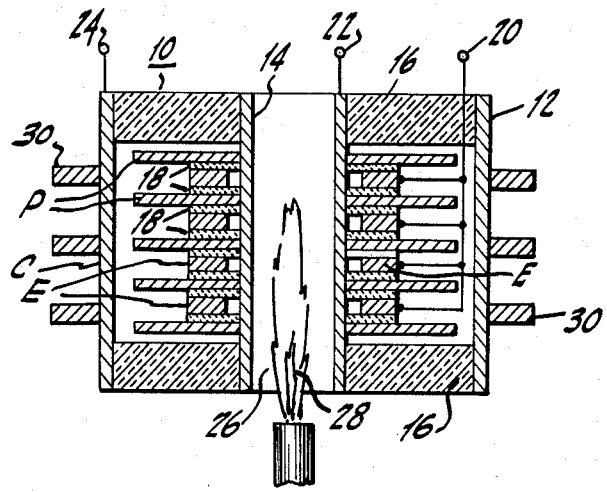

Jan. 21, 1964  W. B. HALL ETAL  3,119,059
THERMIONIC CONVERTER CIRCUITS
Filed Feb. 28, 1961

INVENTORS
WILLIAM B. HALL &
KARL G. HERNQVIST
BY
Morris␣Rabkin
Attorney

United States Patent Office

3,119,059
Patented Jan. 21, 1964

3,119,059
THERMIONIC CONVERTER CIRCUITS
William B. Hall, Lancaster, Pa., and Karl G. Hernqvist, Princeton, N.J., assignors to Radio Corporation of America, a corporation of Delaware
Filed Feb. 28, 1961, Ser. No. 92,265
6 Claims. (Cl. 322—2)

This invention relates generally to thermionic converter circuits, and more particularly to novel thermionic converter circuits for converting heat energy into A.-C. (alternating current) electrical energy. The thermionic converter circuits of the present invention are particularly useful for converting the heat energy of a gas flame, for example, into A.-C. electrical energy of the kind required to operate common home appliances.

The thermionic converters employed in the circuits of the present invention are three-electrode discharge devices for converting heat energy directly into electrical energy. The thermionic converter comprises an electron-emitting cathode, a positive ion-producing electrode, and a collector mounted within an air evacuated envelope. In operation, heat is supplied to the cathode to increase the potential energy of some electrons therein from the Fermi level of the cathode to the top of the potential barrier at the cathode surface. This increase of energy is equal to the work function of the cathode. Heating the ion-producing electrode to a suitable temperature causes it to emit positive ions and to neutralize the negative space charge about the cathode so that electrons emitted from the cathode surface drift easily to the collector electrode. The electrons that are collected by the collector lose, by virtue of their being collected, an amount of potential energy equal to the work function of the collector. The energy lost by the electrons appears as heat in the collector. The potential energy remaining in the electrons that reach the collector is the energy equal to the work function of the cathode minus the work function of the collector.

The envelope of the thermionic converter may contain a gas, such as an ionizable alkali metal vapor. Cesium has been found suitable for this purpose. Positive ions are produced within the envelope when the cesium atoms contact the ion-producing electrode. This phenomenon of contact ionization causes neutralization of the space charge of the electrons emitted by the heated cathode so that the electrons can flow easily from the cathode to the collector.

In another type of three-electrode thermionic converter, also suitable for use in the circuits of the present invention, the ion-producing electrode comprises material which emits positive ions when the electrode is heated. Such an ion-emitting electrode can be made of a material known as $\beta$-eucryptite, for example. Because the resultant effect is the same, regardless of the type of positive ion-producing electrode employed, the terms "electrode" and "ion-producing electrode" are intended to be generic to either a contact-ionizing electrode or an ion-emitting electrode. Three-electrode thermionic converters of the aforementioned types, suitable for use in circuits of the present invention, are described in detail in a copending patent application, Serial No. 51,961, filed August 25, 1960, in the U.S. Patent Office by Karl G. Hernqvist for a "Low Temperature Thermionic Energy Converter."

It has been proposed to convert heat energy into D.-C. (direct current) electrical energy by means of a thermionic converter of the diode type, prior art thermionic converters being primarily two-electrode devices. The efficient conversion of heat energy into A.-C. electrical energy, however, has not been accomplished by prior art thermionic converters. Also, since the usual output voltage of a thermionic converter is relatively low some means for increasing the output voltage is often necessary to utilize it for practical use.

Accordingly, it is an object of the present invention to provide novel thermionic converter circuits for converting heat energy into A.-C. electrical energy.

Another object of the present invention is to provide novel means for converting heat energy into A.-C. electrical energy with the aid of a converter that functions both as a source of electrical energy and as a current switching element.

A further object of the present invention is to provide novel thermionic converter circuits employing a pair of three-electrode thermionic converters operating in push-pull to provide an A.-C. electrical output.

A further object of the present invention is to provide novel thermionic converter circuits for the purposes described that are simple in construction, easy to operate, and efficient in use.

The thermionic converter circuit of the present invention comprises, in its simplest form, a thermionic converter having an electron-emitting cathode, a positive ion-emitting electrode, and a collector within an air-evacuated envelope. A source of heat energy is applied to the cathode and to the positive ion-emitting electrode so that electrons are emitted from the cathode in an environment of positive ions. A source of A.-C. signals is connected between the cathode and the positive ion-producing electrode to vary periodically the positive ion concentration within the envelope. Since the work function of the collector is lower than the work function of the cathode, electrons reaching the collector retain potential energy whose magnitude is equal to the difference between the cathode work function and the collector work function. The collector is connected to the cathode through the primary winding of a transformer so that the electrons that have reached the collector may return periodically to the cathode. This periodic flow of electrons produces an A.-C. current in the circuit. The voltage across the primary winding is transformed by the secondary winding of the transformer into an A.-C. voltage of desired amplitude for a suitable load.

In another embodiment of the present invention, a pair of three-electrode thermionic converters are connected in a push-pull arrangement. The collectors are connected to each other through the primary winding of a transformer, and the cathodes are connected directly to each other. A.-C. signals for varying the positive ion concentration periodically in the thermionic converters are applied between the cathodes and the ion-producing electrodes. Heat applied to the cathodes causes electrons to flow periodically from the cathode to the collectors when the positive ion concentration is varied periodically. A center tap of the primary winding is connected to the cathodes so that current flows alternately in each half of the primary winding. The voltage across the primary is transformed by the secondary winding of the transformer to provide an A.-C. voltage of suitable amplitude to a load.

In still another embodiment of the present invention, a pair of three-electrode thermionic converters are connected in push-pull arrangement employing two transformers. A saturable transformer is used to provide properly phased A.-C. signals to operate the converters in a push-pull arrangement, and an unsaturable transformer is used to provide an A.-C. output of desired amplitude.

Figure 2:
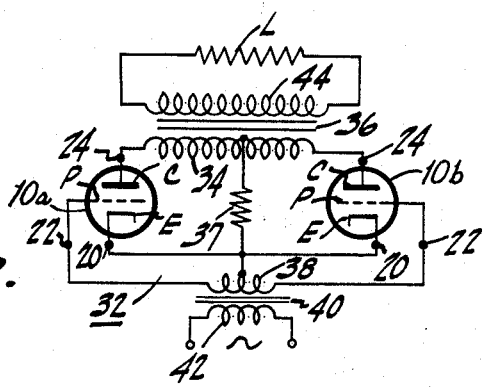
Figure 3:
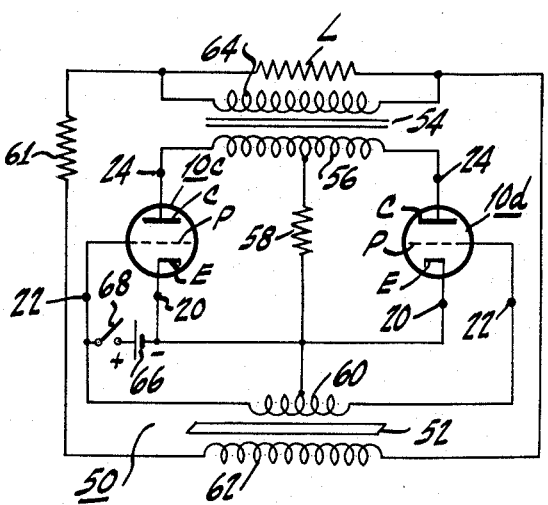

The novel features of the present invention, both as to its organization and methods of operation, as well as additional objects and advantages thereof, will be understood more readily from the following description, when read in connection with the accompanying drawing, in which the same reference characters represent similar parts, and in which:

FIGURE 1 is a cross-sectional view of one form of three-electrode thermionic converter of the type useful in circuits according to the present invention;

FIGURE 2 is a schematic diagram of a pair of three-electrode thermionic converters connected in a push-pull arrangement to convert heat energy into A.-C. electrical energy in accordance with the present invention; and FIGURE 3 is a schematic diagram of another embodiment of a pair of three-electrode thermionic converters in a push-pull arrangement to convert heat energy into A.-C. electrical energy in accordance with the present invention.

Referring, now, to FIG. 1, there is shown a thermionic converter 10 of the type which may be used in the thermionic converter circuits of the present invention. The thermionic converter 10 comprises an annular, vacuum-tight envelope 12 bounded by an inner cylindrical metal wall 14, an outer cylindrical metal wall C, and end walls 16 between the inner and outer cylindrical walls 14 and C. Mounted within the envelope 12 and concentrically surrounding the inner wall 14 is a stacked array of electron-emitting cathode elements E and positive ion-producing electrode elements P. The cathodes E and the electrodes P are electrically insulated from each other by insulating washers 18. Since the electrode elements P usually must be at a higher temperature than the cathode elements E, the former are preferably in contact with the inner wall 14, whereas the latter are spaced from the inner wall 14, as shown, and the electrically insulating washers 18 are of a material such as beryllium oxide which permits good thermal conductivity from the electrode elements P to the cathode elements E. The outer wall C of the thermionic converter 10 serves as the collector electrode.

All of the cathode elements E are electrically connected to each other and a common connection is brought out therefrom to an output terminal 20, which is the cathode terminal. By the term "cathode" or "cathode E," as used herein, is meant the structure comprising all of the cathode elements E. Also, by the term "electrode" or "ion-producing electrode P," as used herein, is meant the structure comprising all of the electrode elements P connected in common by means of the inner wall 14. The inner wall 14 is connected to a terminal 22, which is the ion-producing electrode terminal, and the collector C is connected to a terminal 24, which is the collector terminal.

The envelope 12 may contain a quantity of ionizable gas atoms, such as cesium vapor. If a gas is used, the compositions of the ion-producing electrode P, the cathode C and the gas atoms are such that the work function of the electrode P exceeds the work function of the cathode C and the ionization potential of the gas. If the ion-producing electrode P is an ion-emitter by virtue of its chemical composition, the envelope 12 may be filled with an inert gas, such as xenon, at a relatively low pressure.

The axial through-opening 26 defined by the inner cylindrical tube 14 of the thermionic converter 10 may accommodate an external source of heat 28 for heating the ion-producing electrode P and the cathode E to operate the converter. While the source of heat 28 is shown as a flame, it will be appreciated that the operation of the thermionic converter 10 is not limited to any particular kind of heat source. The thermionic converter 10 may function in response to any heat source capable of raising the cathode E and ion-emitting electrode P to suitable temperatures. Suitable heat sources include, for example, nuclear reactors, solar energy, radioactive energy, and the like. The collector C should be kept cool to prevent it from emitting electrons. To this end, one or more annular heat-radiating fins 30 may be fixed to the collector C for cooling purposes.

Referring, now, to FIG. 2, there is shown, schematically, a thermionic converter circuit 32 employing a pair of thermionic converters 10a and 10b each being similar to the thermionic converter 10 of FIG. 1. The thermionic converters 10a and 10b are arranged in a push-pull circuit for converting heat energy directly into A.-C. electrical energy. To this end, the collectors C of the thermionic converters 10a and 10b are connected to each other through the primary winding 34 of an output transformer 36. The cathodes E of the thermionic converters 10a and 10b are connected directly to each other, and to the center tap on the primary winding 34 through a resistor 37. The resistor 37 has a very low resistance, about 0.2 ohm, and may be omitted, that is, shorted, if one does not wish to sample the output current. The electrodes P of the thermionic converters 10a and 10b are connected to each other through the secondary winding 38 of a transformer 40. The center tap on the secondary winding 38 is connected to the cathodes E of the thermionic converters 10a and 10b. The primary winding 42 of the transformer 40 is adapted to be coupled to a source of A.-C. electrical signals. A load L, represented as a resistor in FIGURE 2, is connected across the secondary winding 44 of the transformer 36.

The operation of the circuit 32 for converting heat energy into A.-C. electrical energy for the load L will now be described. Heat is applied to the cathodes E and the ion-producing electrodes P of the thermionic converters 10a and 10b. A.-C. signals are applied to the ion-producing electrodes P through the transformer 40 so that the electrode P of the thermionic converter 10a is positive when the electrode P of the thermionic converter 10b is negative, and vice versa. When the electrode P is positive in one thermionic converter, the positive ion concentration within this thermionic converter is increased, and the negative space charge about the adjacent cathode E is reduced. This action allows electrons from the cathode E to drift periodically to the collector C. Each electron from the cathode E to the collector C retains, at the collector C, potential energy aquivalent in magnitude to the difference in the work functions of the cathode E and collector C. Thus, each thermionic converter becomes a source of A.-C. electrical potential between its cathode E and collector C. Electrons can now flow periodically, in each thermionic converter external circuit, from the collector C, through its adjacent one-half of the primary winding 34, and to the cathode E. Since the polarities of the A.-C. signals applied to the electrodes P, respectively, are 180° out of phase with each other, current flows in opposite directions alternately in each one-half portion of the primary winding 34. The voltage across the primary winding 34 may be transformed into any desired voltage by a suitable secondary winding 44 for application to the load L. The resistor 37 is used only for sampling the converter output current so that its waveform may be applied to an oscilloscope (not shown) or otherwise measured.

Referring, now, to FIG. 3, there is shown a thermionic converter circuit 50 for converting heat energy directly into A.-C. electrical energy by means of a pair of thermionic converters 10c and 10d, each being similar to the thermionic converter 10 of FIG. 1. The circuit 50 is a self-excited oscillator, once started, whose frequency is determined by the circuit elements.

In the embodiment of the circuit of FIG. 3, a saturable transformer 52 and a conventional, non-saturable transformer 54 are used. The collectors C of the thermionic converters 10c and 10d are connected to each other through the primary winding 56 of the transformer 54. The cathodes E of the thermionic converters 10c and 10d are connected directly to each other and to the center tap of the primary winding 56 through a resistor 58. The electrodes P of the thermionic converters 10c and 10d are connected to each other through the secondary winding 60 of the transformer 52. A center tap on the secondary winding 60 is connected to the cathodes E. The primary winding 62 of the transformer 52 is connected in series with a dropping resistor 61 and the parallel combination of the secondary winding 64 of the transformer 54 and the load L. A source of voltage, such as a battery 66, is connected between the electrode P and the cathode E of the thermionic converter 10c through a switch 68 for starting purposes only.

It will be understood that, when the switch 68 is closed momentarily, the electrode P of the thermionic converter 10c is biased positively with respect to the cathode E. This causes the positive ion concentration to increase within the thermionic converter 10c and permits electrons from the cathode E, when heated, to travel to the collector C. Because of the potential energy remaining in these electrons at the collector C, current flows through one-half of the primary winding 56, through the resistor 58, and back to the cathode E of the thermionic converter 10c. The voltage across the primary winding 56, resulting from the aforementioned current, causes a transformed voltage to appear across the secondary winding 64, so that current flows through the load L. Current also flows in the primary winding 62 of the saturable transformer 52 inducing a voltage across the secondary winding 60. The secondary winding 60, therefore, has induced in it voltages that cause the electrodes P in their respective thermionic converters 10c and 10d to vary the ion concentration periodically and alternately and to maintain the circuit 50 in continuous operation, once it has been started. The resistor 58 is used for sampling the A.-C. output so that the output wave may be applied to an oscilloscope (not shown). The resistor 58 may be shorted if it is not desired to sample the output current.

From the foregoing description, it will be apparent that there have been provided improved circuits employing thermionic converters for generating electrical energy and for switching this energy in a manner to provide an A.-C. electrical output. While two thermionic converter circuits have been shown and described, variations of these circuits coming within the spirit of this invention will, no doubt, readily suggest themselves to those skilled in the art. Hence, it is desired that the foregoing shall be considered merely as illustrative and not in a limiting sense.

What is claimed is:

1. Means for converting heat energy into A.-C. electrical energy, said means comprising a thermionic converter including an envelope containing a cathode, a collector spaced from said cathode and having a lower work function than the work function of said cathode, an ion-producing electrode disposed between said collector and said cathode and adapted, when heated, to produce positive ions within said envelope, means for applying heat energy to said electrode and to said cathode to cause said cathode to emit electrons, means for applying A.-C. signals between said electrode and said cathode to bias said electrode positively periodically with respect to said cathode so as to vary the ion concentration periodically within said envelope whereby electrons will flow periodically from said cathode to said collector and retain potential energy after contacting said collector, and circuit means connecting said collector to said cathode to cause said last-mentioned electrons to flow therethrough.

2. Means for converting heat energy into A.-C. electrical energy as defined in claim 1 wherein said circuit means comprises the primary winding of a transformer, a secondary winding coupled to said primary winding, and means to apply a load across said secondary winding.

3. Means for converting heat energy into A.-C. electrical energy, said means comprising a thermionic converter having an envelope containing an ionizable gas, a cathode, a collector spaced from said cathode and having a lower work function than the work function of said cathode, and a positive ion-producing electrode disposed between said cathode and said collector and having a work function higher than that of said cathode, said electrode being adapted when heated to produce positive ions, means for heating said cathode to an electron-emitting temperature, means to apply A.-C. signals between said electrode and said cathode to bias said electrode positively periodically with respect to said cathode so as to vary the positive ion concentration periodically whereby to cause said electrons to flow periodically easily from said cathode to said collector, a transformer having a primary winding and a secondary winding, means connecting said primary winding between said collector and said cathode whereby electrons emitted from said cathode and collected by said collector can flow from said collector to said cathode, and means to connect a load across said secondary winding.

4. Apparatus for converting heat energy into A.-C. electrical energy comprising a pair of thermionic converters each having a collector, an ion-producing electrode adapted, when heated, to emit positive ions, and an electron-emitting cathode, means connecting said cathodes to each other, a transformer having a primary winding and a secondary winding, means connecting said primary winding between said collectors, means connecting said cathodes to a tap on said primary winding, means to apply A.-C. signals between said cathodes and said electrodes to bias each of said electrodes positively periodically with respect to each of said cathodes in each of said thermionic converters so that the instantaneous polarity of one of said signals at one of said electrodes is opposite to the polarity of one of said signals at the other of said electrodes, means to apply heat energy to said electrodes and said cathodes, and means to derive an A.-C. output across said secondary winding.

5. A circuit for converting heat energy into A.-C. electrical energy comprising a pair of thermionic converters each having a collector, an ion-emitting electrode adapted, when heated, to emit positive ions, and a cathode, two transformers each having a primary winding and a secondary winding, means connecting said collectors to each other through said primary winding of one of said transformers, said last-mentioned primary winding having a center tap, means connecting said center tap to said cathodes, means connecting said electrodes to each other through said secondary winding of the other of said transformers, said last-mentioned secondary winding having a center tap connected to said cathodes, means connecting said secondary winding of said one transformer in series with said primary winding of said other transformer, means to derive an A.-C. output across said secondary winding of said one transformer, and means to apply a source of unidirectional voltage momentarily between said electrode and said cathode in one of said thermionic converters for starting purposes, said electrode being biased positively with respect to said cathode when said source of unidirectional voltage is applied.

6. A circuit for converting heat energy into A.-C. electrical energy comprising a pair of thermionic converters each having a collector, an ion-emitting electrode adapted, when heated, to emit positive ions, and a cathode, two transformers each having a primary winding and a secondary winding, means connecting said collectors to each other through said primary winding of one of said transformers, said last-mentioned primary winding having a center tap, means connecting said center tap to said cathodes, means connecting said electrodes to each other through said secondary winding of the other of said transformers, said last-mentioned secondary winding having a center tap connected to said cathodes, means connecting said secondary winding of said one transformer in series with said primary winding of said other transformer, means to derive an A.-C. output across said secondary winding of said one transformer, and means to apply a source of unidirectional voltage momentarily between said electrode and said cathode in one of said thermionic converters for starting purposes, said electrode being biased positively with respect to said cathode when said source of unidirectional voltage is applied, said other transformer being relatively more easily saturated than said one transformer.

References Cited in the file of this patent
UNITED STATES PATENTS
2,881,384    Durant _____ Apr. 7, 1959